(12) United States Patent
Driver et al.

(10) Patent No.: US 7,637,721 B2
(45) Date of Patent: Dec. 29, 2009

(54) METHODS AND APPARATUS FOR PRODUCING WIND ENERGY WITH REDUCED WIND TURBINE NOISE

(75) Inventors: Howard Daniel Driver, Greer, SC (US); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 603 days.

(21) Appl. No.: 11/193,696

(22) Filed: Jul. 29, 2005

(65) Prior Publication Data

US 2007/0025858 A1    Feb. 1, 2007

(51) Int. Cl.
*F03D 11/00*    (2006.01)

(52) U.S. Cl. ................. 416/224; 416/229 R; 416/241 A

(58) Field of Classification Search .................... 416/62, 416/224, 229 R, 230, 241 A
See application file for complete search history.

(56) References Cited

U.S. PATENT DOCUMENTS

| 4,295,790 | A | * | 10/1981 | Eggert, Jr. .................... 416/226 |
| 4,462,559 | A | * | 7/1984 | Garza ....................... 244/17.19 |
| 5,499,904 | A | * | 3/1996 | Wallace et al. ............... 416/230 |
| 5,533,865 | A | | 7/1996 | Dassen et al. |
| 5,542,820 | A | * | 8/1996 | Eaton et al. .................. 416/224 |
| 5,881,972 | A | * | 3/1999 | Smith et al. .................. 244/121 |
| 6,132,181 | A | | 10/2000 | McCabe |
| 6,139,278 | A | * | 10/2000 | Mowbray et al. ........ 416/229 A |
| 6,213,721 | B1 | | 4/2001 | Watkinson |
| 6,253,101 | B1 | | 6/2001 | Seng et al. |
| 6,341,747 | B1 | * | 1/2002 | Schmidt et al. ........... 244/123.1 |
| 6,478,541 | B1 | | 11/2002 | Charles et al. |
| 6,729,846 | B1 | | 5/2004 | Wobben |
| 6,830,436 | B2 | | 12/2004 | Shibata et al. |
| 2003/0175121 | A1 | | 9/2003 | Shibata et al. |
| 2003/0184292 | A1 | | 10/2003 | Meyer et al. |
| 2005/0008495 | A1 | | 1/2005 | Wobben |
| 2005/0053466 | A1 | * | 3/2005 | Finn et al. .................... 416/230 |

* cited by examiner

*Primary Examiner*—Ninh H Nguyen
(74) *Attorney, Agent, or Firm*—James McGinness, Esq.; Armstrong Teasdale LLP

(57) ABSTRACT

A trailing edge cap for a blade includes a body configured to mount on at least two differently at least one of sized and shaped blades such that the body at least partially covers an original trailing edge portion of the blade. The body has a body edge portion for forming a new trailing edge portion of the blade when the body is mounted on the blade.

21 Claims, 6 Drawing Sheets

METHODS AND APPARATUS FOR PRODUCING WIND ENERGY WITH REDUCED WIND TURBINE NOISE

BACKGROUND OF THE INVENTION

This invention relates generally to blades that may be useful as wind turbine rotor blades and to rotors and wind turbines utilizing such blades.

Some known wind turbine rotor blades may generate considerable noise, particularly at higher rotor speeds, which may bother people and/or entities, for example residential communities, located near the wind turbine. As a consequence, authorities with responsibility for granting permission for setting up wind turbines may refuse permission because of the noise levels. For example, in some parts of the world, issuance of permits for wind turbines is based on the environmental noise impact affected or potentially affected by the wind turbine.

One example of noise emitted by known wind turbine rotor blades is noise emitted from trailing edges of the blades because of interaction between boundary layer air and the trailing edge. Generally, greater trailing edge thicknesses generate higher noise levels. However, manufacturing and transporting blades with a reduced trailing edge thickness may be difficult, for example, without damaging the trailing edge. Accordingly, some known blades include a separate trailing edge piece that covers and reduces a thickness of the trailing edge. The separate trailing edge piece can be mounted on the blade after transportation of the blade to a wind turbine. However, some known separate trailing edge pieces may not mount flush with an outer surface of the blade. Accordingly, although the separate trailing edge piece may reduce a thickness of the blade, a seam between the separate trailing edge piece and the outer surface may increase noise emitted because of interaction of boundary layer air with the seam. Some known rotor blades use custom trailing edge pieces designed to fit generally flush to a specific blade shape. However, such custom trailing edge pieces may only fit the specific blade shape they are designed for and therefore may increase an overall cost of a group of wind turbines having differently shaped rotor blades.

BRIEF DESCRIPTION OF THE INVENTION

In one aspect, a trailing edge cap for a blade includes a body configured to mount on at least two differently at least one of sized and shaped blades such that the body at least partially covers an original trailing edge portion of the blade. The body has a body edge portion for forming a new trailing edge portion of the blade when the body is mounted on the blade.

In another aspect, a trailing edge cap for a blade includes a body configured to mount on the blade such that the body at least partially covers an original trailing edge portion of the blade. The body includes a body edge portion for forming a new trailing edge portion of the blade when the body is mounted on the blade. The body also includes at least one of a thickness of between about 1 mil and about 100 mils, a modulus of elasticity of between about 0.5 GPa and about 5 GPa, and a polymer.

In another aspect, a blade includes a body having a leading edge portion and an original trailing edge portion, and a trailing edge cap mounted on the body. The trailing edge cap at least partially covers the original trailing edge portion. The trailing edge cap includes an edge portion that forms a new trailing edge portion of the body, and at least one of a thickness of between about 1 mil and about 100 mils, a modulus of elasticity of between about 0.5 GPa and about 5 GPa, and a polymer.

In another aspect, a method includes providing a trailing edge cap for a blade, wherein the trailing edge cap comprises at least one of a thickness of between about 1 mil and about 100 mils, a modulus of elasticity of between about 0.5 GPa and about 5 GPa, and a polymer, and mounting the trailing edge cap on the blade such that the trailing edge cap at least partially covers a trailing edge portion of the blade.

BRIEF DESCRIPTION OF THE DRAWINGS

Corresponding reference characters indicate corresponding parts throughout the several views of the drawings.

DETAILED DESCRIPTION OF THE INVENTION

As used herein, the term "blade" is intended to mean anything that provides reactive force when in motion relative to a surrounding fluid. As used herein, the term "edge" is intended to mean a side formed by the intersection of two things (e.g., sides, surfaces, etc.). An "edge", as used herein, may include a curved surface. As used herein, the term "sweep" refers to an angle of an elastic axis relative to a pitch axis of a blade, where the "elastic axis" refers to a locus of points defining a torsional or bending center at each spanwise section of the blade. As used herein, the term "trailing edge" is intended to mean a side formed by the intersection of a high pressure side and a low pressure side of a blade. As used herein, the term "wind turbine" is intended to mean anything that generates rotational energy from wind energy, and more specifically, converts kinetic energy of wind into mechanical energy. As used herein, the term "wind generator" is intended to mean a wind turbine that generates electrical power from rotational energy generated from wind energy, and more specifically, converts mechanical energy converted from kinetic energy of wind to electrical power. As used herein, the term "windmill" is intended to mean a wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
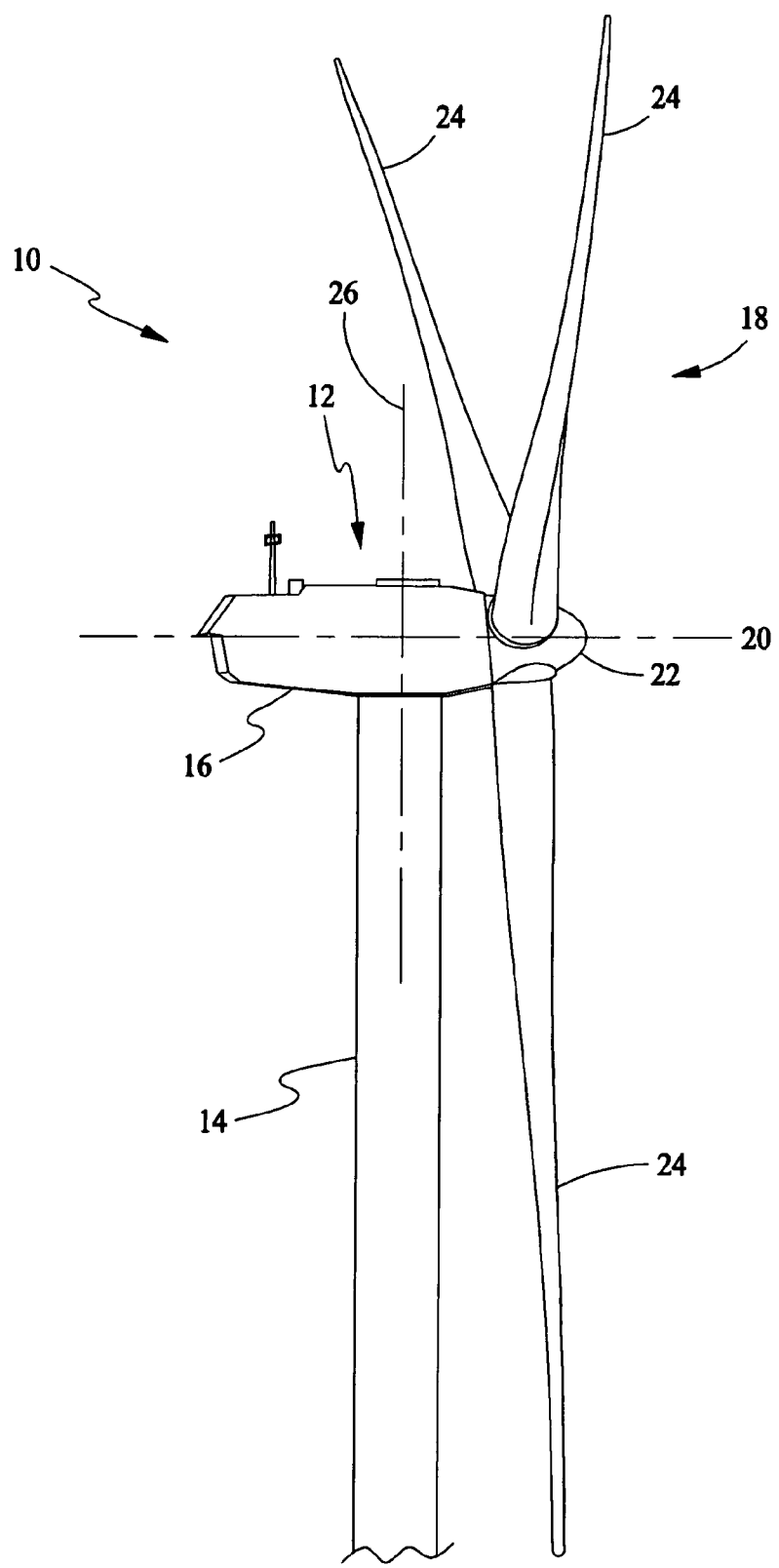
FIG. 1 is a perspective of an exemplary embodiment of a wind turbine.

Referring now to the drawings, and more specifically to FIG. 1, an exemplary embodiment of a wind turbine is designated in its entirety by the reference numeral 10. Wind turbine 10 described and illustrated herein includes a wind generator (generally designated by 12) for generating electrical power from wind energy. However, in some embodiments, wind turbine 10 may include, in addition or alternative to wind generator 12, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Although only one wind turbine 10 is shown in FIG. 1, in some embodiments a plurality of wind turbines 10 may be grouped together, sometimes referred to as a "wind farm".

As shown in FIG. 1, in some embodiments wind generator 12 is mounted on a tower 14 (only a portion of which is shown in FIG. 1), however, in some embodiments wind turbine 10 includes, in addition or alternative to tower-mounted wind generator 12, a wind generator (and/or other type of wind turbine) adjacent the ground and/or a surface of water. The height of tower 14 may be selected based upon factors and conditions known in the art. Wind generator 12 includes a body (generally designated by 16), sometimes referred to as a "nacelle", and a rotor (generally designated by 18) mounted on body 16 for rotation about an axis of rotation 20. Rotor 18 includes a hub 22 and a plurality of blades 24 (sometimes referred to as "airfoils") extending radially outwardly from hub 22 for converting wind energy into rotational energy. Rotor 18 is described and illustrated herein as having three blades 24. However, rotor 18 may have any number of blades 24. Blades 24 may each have any length (whether described herein). For example, in some embodiments one or more blades 24 are about 0.5 meters long, while in some embodiments one or more blades 24 are about 50 meters long. Other examples of blade 24 lengths include 10 meters or less, about 20 meters, about 37 meters, and about 40 meters. Still other examples include blades between 50 and 100 meters long. Moreover, despite how blades 24 are illustrated in FIG. 1, rotor 18 may have blades of any shape, and may have blades of any type and/or any configuration, whether such shape, type, and/or configuration is described and/or illustrated herein. One example of another type, shape, and/or configuration of blades 24 of rotor 18 is a ducted rotor (not shown) having a turbine (not shown) contained within a duct (not shown). Another example of another type, shape, and/or configuration of blades 24 of the rotor 18 is a darrieus wind turbine, sometimes referred to as an "eggbeater" turbine. Yet another example of another type, shape, and/or configuration of blades 24 of rotor 18 is a savonious wind turbine. Even another example of another type, shape, and/or configuration of blades 24 of rotor 18 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Wind generator 12 includes an electrical generator (not shown) mounted on body 16 and operatively connected to rotor 18 for generating electrical power from the rotational energy generated by rotor 18. General operation of the electrical generator to generate electrical power from the rotational energy of rotor 18 is known in the art and therefore will not be described in more detail herein.

In some embodiments, wind turbine 10 may include one or more controllers (not shown) mounted on body 16 and operatively connected to some or all of the components of wind generator 12 for generally controlling operation of wind generator 12 and/or as some or all of the components thereof (whether such components are described and/or illustrated herein). For example, the controller(s) may be used for overall system monitoring and control including, for example, pitch and speed regulation, high-speed shaft and yaw brake application, yaw and pump motor application, and fault monitoring. Alternative distributed or centralized control architectures may be used in some embodiments. In some embodiments, wind generator 12 may include a brake (not shown) mounted on the body 16 for braking rotation of rotor 18 to, for example, reduce the generation of electrical power from the electrical generator. Furthermore, in some embodiments, wind generator 12 may include a yaw drive (not shown) for rotating wind generator 12 about an axis of rotation 26 for changing a yaw of rotor 18, and more specifically for changing a direction faced by rotor 18 to, for example, adjust an angle between the direction faced by rotor 18 and a direction of wind. Moreover, in some embodiments the wind generator 12 may include an anemometer (not shown) for measuring wind speed. The anemometer, in some embodiments, may be operatively connected to the controller(s) for sending measurements to the controller for processing thereof. In some embodiments, wind generator 12 includes a wind vane (not shown) for measuring wind direction. The wind vane, in some embodiments, may be operatively connected to the controller(s) and/or the yaw drive for changing a yaw of rotor 18. In some embodiments, wind generator 12 includes a variable blade pitch drive (not shown) for controlling a pitch of rotor blades 24. The variable blade pitch drive may be operatively connected to the controller(s) for control thereby. In some embodiments, the pitches of blades 24 are individually controlled by the blade pitch drive. General operation of wind turbine 10, and more specifically wind generator 12, is known in the art and therefore will not be described in more detail herein.

Figure 2:
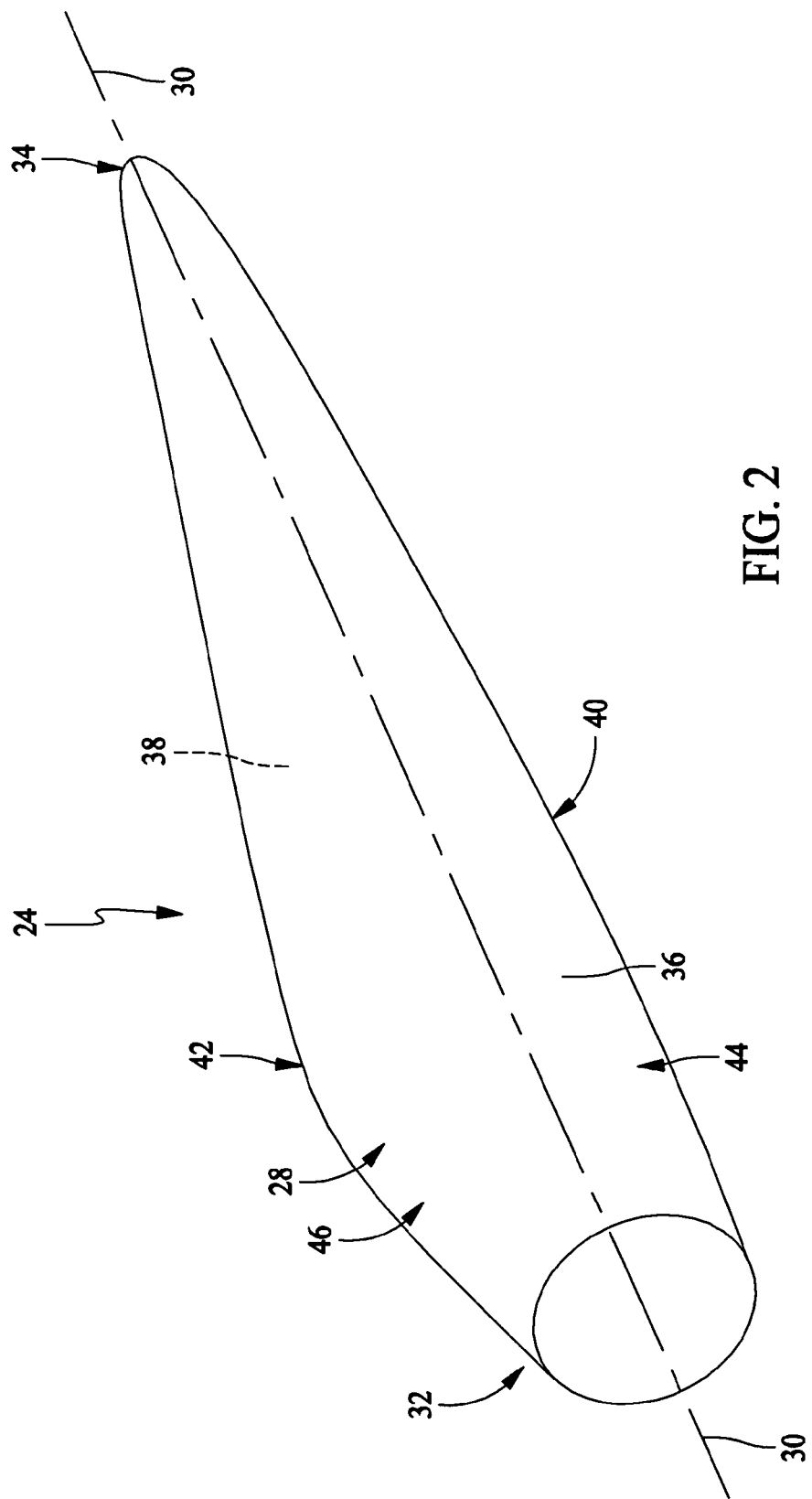
FIG. 2 is a perspective of an exemplary embodiment of a rotor blade for use with the wind turbine shown in FIG. 1.

Referring now to FIG. 2, an exemplary embodiment of a blade 24 includes a body (generally designated by 28) extending along a central axis 30 between a root (generally designated by 32) that mounts on hub 22 (FIG. 1) and a tip (generally designated by 34). Body 28 includes a higher pressure side 36 and a lower pressure side 38 each extending between a leading edge (generally designated by 40) and a trailing edge (generally designated by 42 and sometimes referred to herein as an "original trailing edge"). Each of the leading edge 40 and trailing edge 42 are formed by an intersection between the higher pressure side 36 and the lower pressure side 38. Portions of body 28 generally adjacent leading edge 40 generally form a leading edge portion (generally designated by 44) of body 28 and portions of body 28 generally adjacent trailing edge 42 generally form a trailing edge portion (generally designated by 46 and sometimes referred to herein as an "original trailing edge portion") of body 28.

Figure 3:
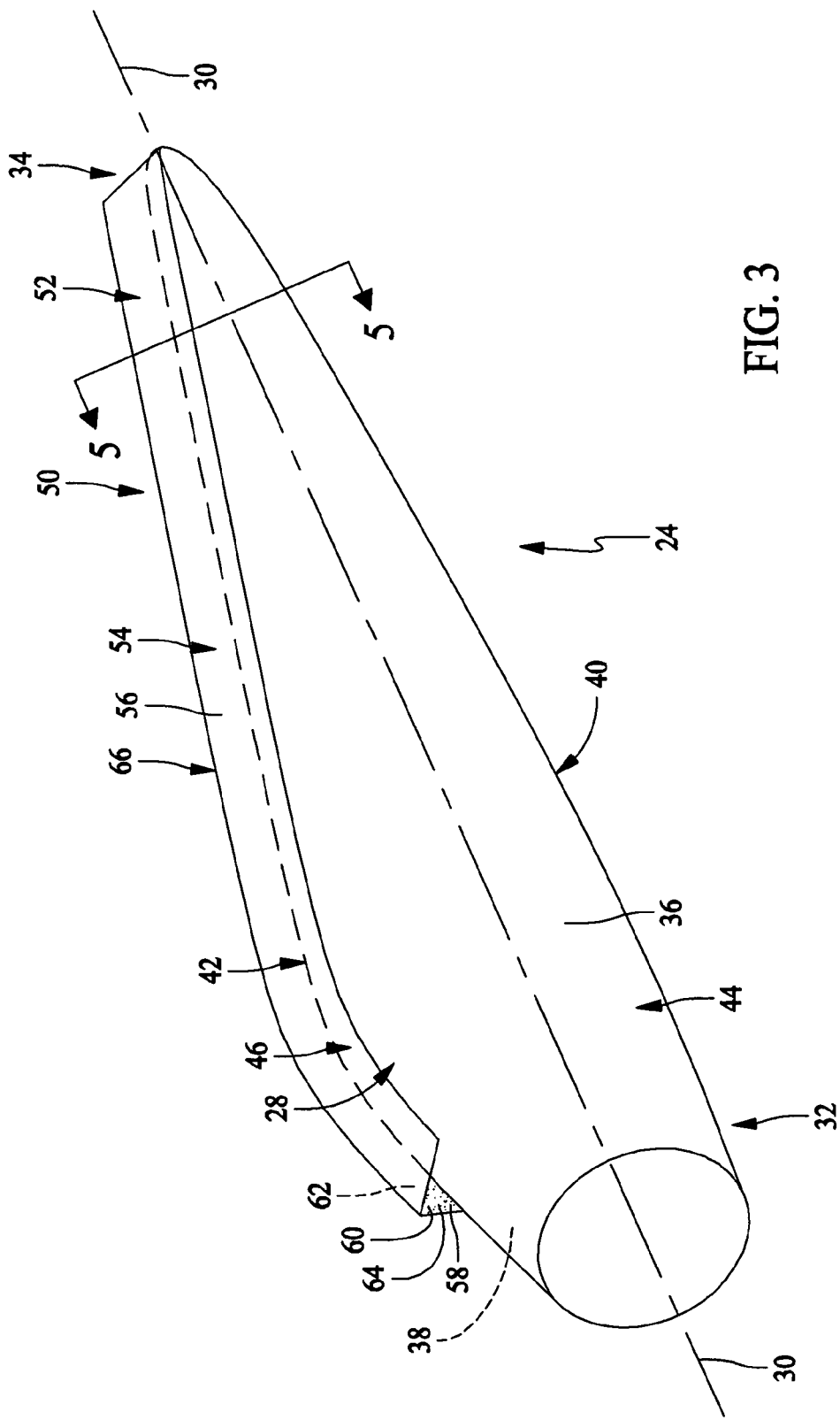
FIG. 3 is a perspective of the exemplary rotor blade shown in FIG. 2 having an exemplary embodiment of a trailing edge cap mounted thereon.
Figure 4:
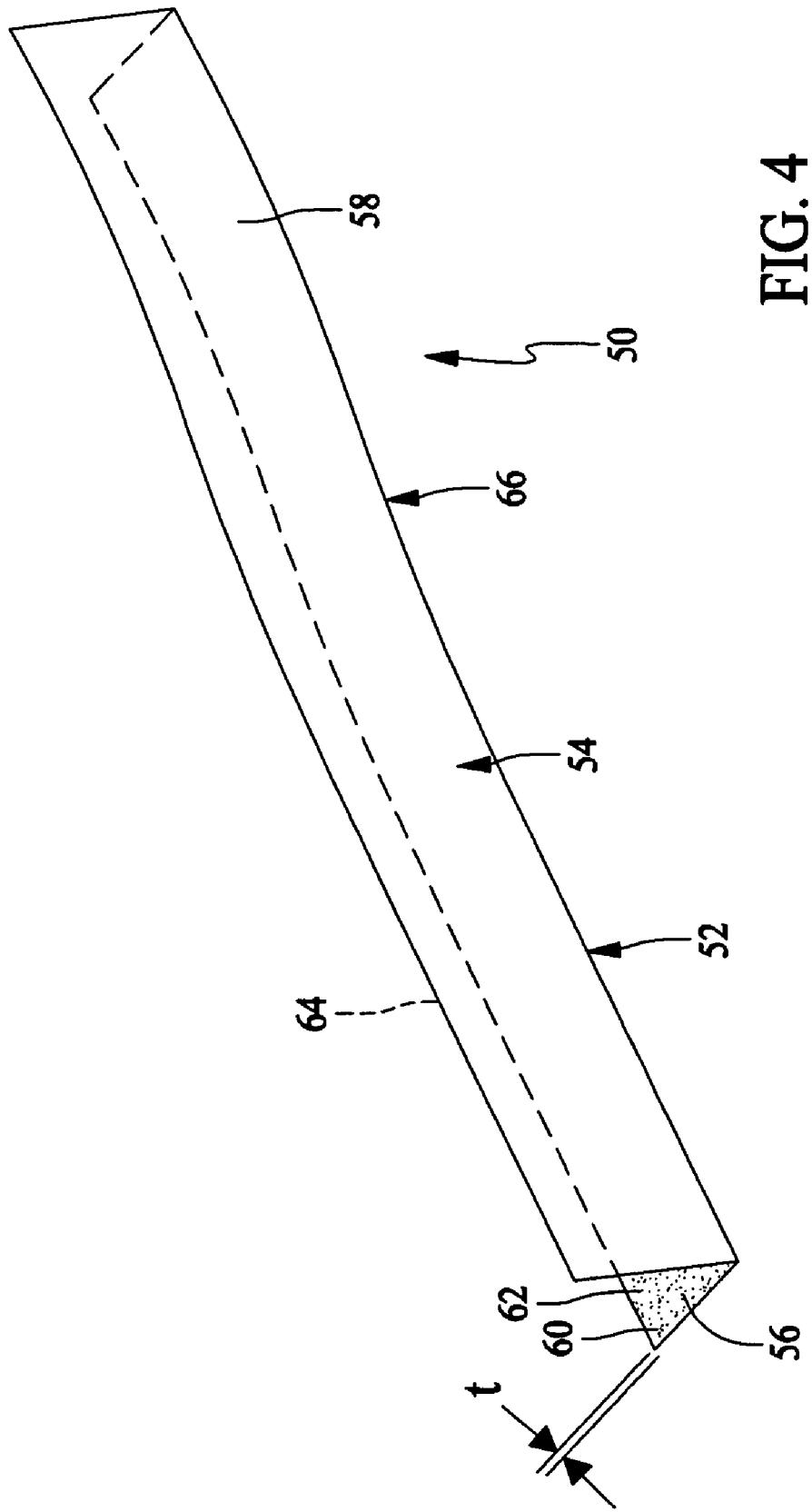
FIG. 4 is a perspective view of the exemplary trailing edge cap shown in FIG. 3.
Figure 5:
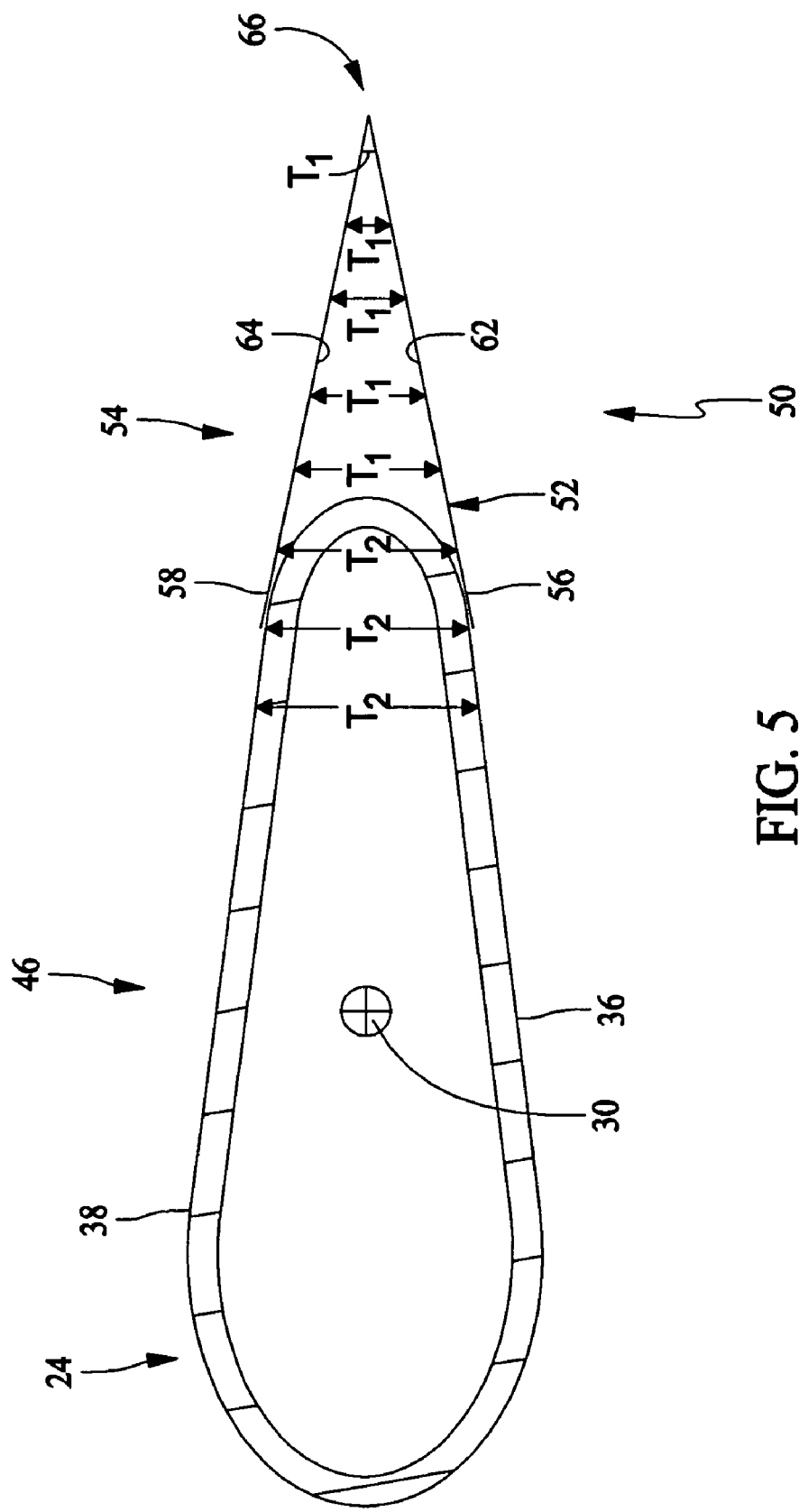
FIG. 5 is a cross section of the exemplary rotor blade and exemplary trailing edge cap shown in FIG. 3 taken along line 5-5 of FIG. 3.

Referring now to FIGS. 3-5, an exemplary embodiment of a trailing edge cap (generally designated by 50) is mounted on blade 24 (FIGS. 3 and 5). Trailing edge cap 50 includes a body (generally designated by 52) mounted on blade 24 at least partially covering trailing edge portion 46 (FIGS. 3 and 5) of blade 24 to, for example, form a new trailing edge portion of blade 24 from an edge portion (generally designated by 54) of body 52 of trailing edge cap 50. As will be described in more detail below, the new trailing edge portion of blade 24 may have a reduced thickness as compared to a thickness of the original trailing edge portion 46 of blade 24. Such a reduced thickness may facilitate reducing noise emitted by the blade 24 during operation thereof, as will be described in more detail below.

Body 52 of trailing edge cap 50 includes a high pressure side 56 and a low pressure side 58. Any of high pressure side 56 and/or low pressure side 58 may be referred to herein as a first and/or a second side. High pressure side 56 is mounted on high pressure side 36 (FIGS. 3 and 5) of blade 24 and low pressure side 58 is mounted on low pressure side 38 (FIGS. 3 and 5) of blade 24. Although high pressure side 56 and low pressure side 58 may be mounted on blade 24 in other manners, ways, fashions, configurations, and/or by other means, in the exemplary embodiment high pressure side 56 and/or low pressure side 58 are mounted on high and low pressure sides 36 and 38, respectively, using a suitable adhesive 60 (FIGS. 3 and 4). For example, in some embodiments an inner surface 62 of high pressure side 56 and/or an inner surface 64 of low pressure side 58 includes an adhesive thereon, for example having a backing sheet (not shown) for removal before mounting cap 50 on blade 24.

In the exemplary embodiment illustrated herein, trailing edge cap 50 generally spans a majority of the length of blade 24. However, cap 50 is not limited to the size, shape, and/or location illustrated herein. Rather, cap 50 may be any size, any shape, and/or be located on any portion of blade 24 at least partially covering original trailing edge portion 46 of blade 24. For example, in some embodiments cap 50 does not span a majority of the length of blade 24. In some embodiments, some or all of cap 50 may cover original trailing edge portion 46 of blade 24 adjacent tip 34 (FIG. 3) to facilitate reducing noise generated by blade 24 adjacent tip 34.

Figure 6:
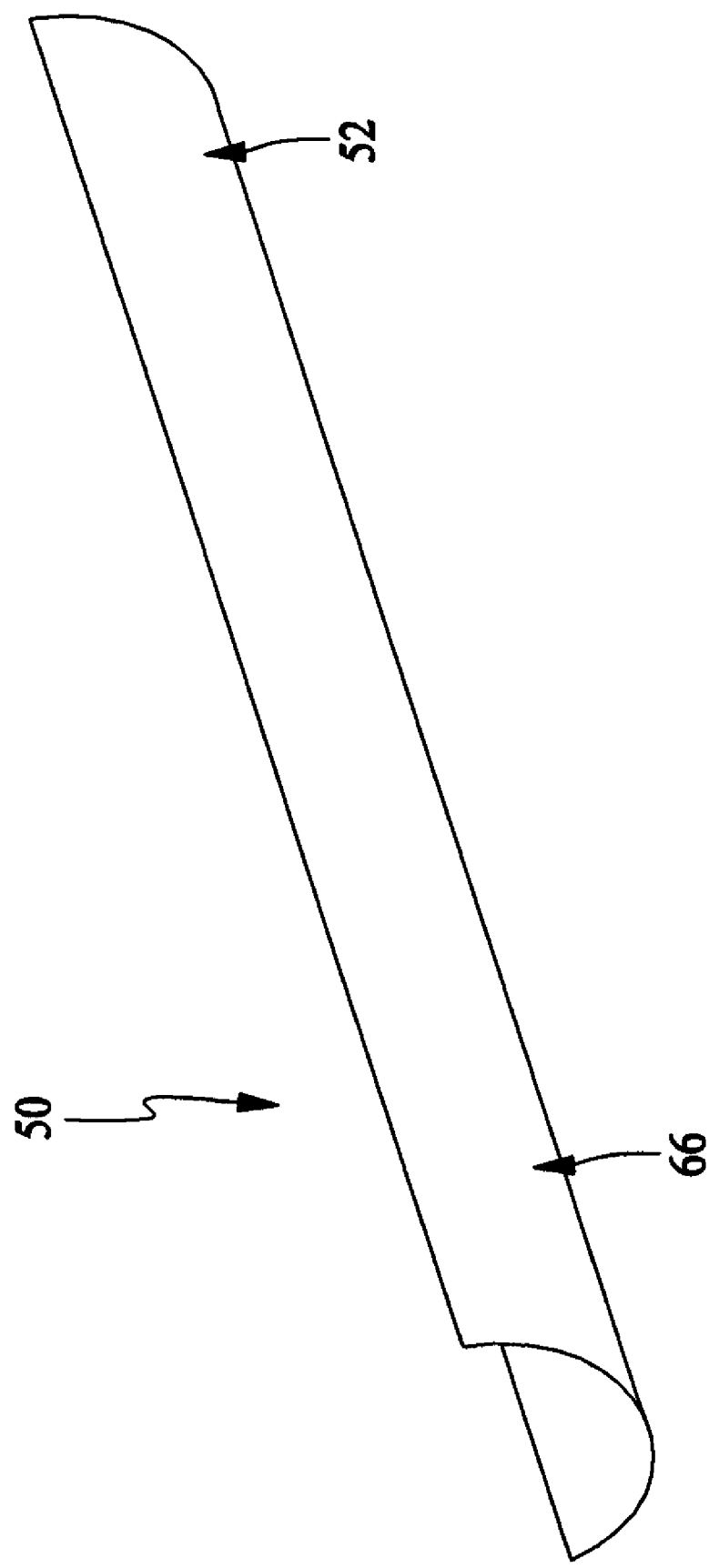
FIG. 6 is a perspective view of another exemplary embodiment of a trailing edge cap.

An edge (generally designated by 66) of body 52 is formed by an intersection between high pressure side 56 and low pressure side 58. Body 52 at least partially covers trailing edge 42 of blade 24 such that edge 66 forms a new trailing edge of blade 24. In some embodiments, edge 66 includes a generally "pointed" side, as shown in FIGS. 3-5. As shown in FIG. 6, in some embodiments edge 66 includes a curved surface. It should be appreciated that even a generally "pointed" side may have some curvature.

Body 52 of trailing edge cap 50 may be fabricated in any manner, fashion, way, configuration, and/or by any means. For example, in some embodiments a shape of body 52 is cut from a material using a laser, water, and/or a clicker die. In some embodiments, body 52 is fabricated from a unitary sheet of material that is creased to form edge 66. In some embodiments, body 52 is fabricated from two or more separate sheets of material that are pre-cut and then bonded together using, for example, a suitable adhesive. In some embodiments, such two or more separate sheets of material may be bonded together generally adjacent edge 66 of body 52. For example, the bond between the separate sheets may facilitate forming edge 66.

Body 52 may include any material having one or more of the properties (such as, but not limited to, thickness, modulus of elasticity, etc.) described herein with respect thereto. Although body 52 may include other materials, in some embodiments body 52 includes a polymer. For example, and although body 52 may include other polymers, in some embodiments body 52 includes a polyimide, such as, but not limited to, Dupont Kapton® available from Dupont High Performance Materials of Circleville, Ohio. Moreover, and for example, although body 52 may include other polymers, in some embodiments body 52 includes polyester. Furthermore, and for example, although body 52 may include other polymers, in some embodiments body 52 includes polyester teratholate (PET). Even further, and for example, although body 52 may include other polymers, in some embodiments body 52 includes polyetheretherketone (PEEK).

Although body 52 may have other thicknesses, in some embodiments body 52 includes a thickness t (FIG. 4) of between about 1 mil and about 100 mils. In the exemplary embodiments, body 52 includes a thickness t that is generally uniform throughout body 52. In some embodiments, body 52 does not have a generally uniform thickness t throughout. For example, in some embodiments body 52 is generally thicker adjacent edge 66.

Although body 52 may include other values for modulus of elasticity, in some embodiments body 52 includes a modulus of elasticity of between about 0.5 GPa and about 5 GPa. In some embodiments, body 52 includes a modulus of elasticity that is generally uniform throughout body 52. In some embodiments, body 52 does not have a generally uniform modulus of elasticity throughout.

As discussed above, and referring now to FIG. 5, the new trailing edge portion of blade 24 formed from edge portion 54 of cap 50 may have a reduced thickness $T_1$ as compared to a thickness $T_2$ of the original trailing edge portion 46 of blade 24. For example, in the exemplary embodiment thicknesses $T_1$ of the new trailing edge portion of blade 24 formed from edge portion 54 of cap 50 are defined between high pressure side 56 and low pressure side 58. Thicknesses $T_2$ of original trailing edge portion 46 of blade 24, for example, are defined between high pressure side 36 and low pressure side 38 in the exemplary embodiment. As can be seen from FIG. 5, thicknesses $T_1$ taken along a general chordwise length of the new trailing edge portion of blade 24 formed from edge portion 54 of cap 50 are each less than thicknesses $T_2$ taken along a general chordwise length of original trailing edge portion 46 of blade 24. Accordingly, a cross-sectional area of the new trailing edge portion of blade 24 formed from edge portion 54 of cap 50 is less than a cross-sectional area of original trailing edge portion 46 of blade 24. Any of thicknesses $T_1$ and thicknesses $T_2$ (whether illustrated herein) may be referred to as a first and/or a second thickness herein.

By providing a reduced thickness of a trailing edge portion of blade 24, trailing edge cap 50 reduces an amount of noise emitted by the blade 24 during operation thereof, such as, but not limited to, noise emitted by a trailing edge portion of blade 24. For example, the reduced thickness of edge 66 of trailing edge cap 50 may reduce an amount of separated flow downstream of blade 24 and therefore may reduce, for example, noise sometimes referred to as "blunt trailing edge noise".

Body 52 of trailing edge cap 50 is configured to be mounted on more than one differently sized and/or shaped blades 24, such as, but not limited to, swept blades, straight blades, twisted blades, etc. For example, because of the thickness, modulus of elasticity, type of material, and/or other properties (whether described herein) of body 52, body 52 has a flexibility that allows body 52 to conform a variety of differently sized and/or shaped trailing edge portions 46 of blades 20, to thereby create a new trailing edge portion of blade 24 from edge portion 54 of cap 50. Moreover, and for example, in addition or alternative to a general flexibility of sides 56 and 58, conformation of cap 50 to a variety of differently sized and/or shaped trailing edge portions 46 of blades 20 may be facilitated by changing an angle between the sides 56 and 58 by bending cap 50 about edge 66 of cap 50. Furthermore, and for example, conformation of cap 50 to a variety of differently sized and/or shaped trailing edge portions 46 of blades 20 may be facilitated by a position of cap 50 with respect to blade 24, such as, but not limited to, an amount that sides 56 and/or 58 overlap sides 36 and/or 38, respectively. The thickness, modulus of elasticity, type of material, and/or other properties (whether described herein) of body 52 may, in some embodiments, be selected to facilitate providing the herein-described flexibility while still maintaining enough strength to facilitate preventing sides 56 and/or 58 from buckling, vibrating, and/or generally deforming under wind loading. In some embodiments, one or more supports (not shown) supports side 56 and/or side 58 to facilitate preventing side 56 and side 58 from buckling, vibrating, and/or generally deforming under wind loadings. For example, in some embodiments foam may be injected between cap 50 and original trailing edge portion 46 of blade 24 to at least partially fill a space defined therebetween for supporting side 56 and/or side 58.

Conformation of cap 50 to a variety of differently sized and/or shaped trailing edge portions 46 of blades 20 may facilitate reducing an overall cost of a group of wind turbines having differently sized and/or shaped blades 24, because custom trailing edge pieces may not be fabricated for each different sized and/or shaped blade 24. Moreover, such conformation to a variety of differently sized and/or shaped trailing edge portions 46 may facilitate increasing and an availability of trailing edge pieces that create new trailing edge portions on blades located at wind turbines. Additionally, the herein-described thicknesses and types of materials of body 52 may facilitate decreasing a cost of blades 24 and/or a weight of blades 24, and/or may facilitate increasing an aerodynamic efficiency of blades 24. Furthermore, the herein described thicknesses of body 52 facilitate reducing a seam created between the body 52 and the blade 24 thereby possibly reducing an amount of noise emitted from blade 24 adjacent and because of the seam.

Embodiments of methods, caps, and blades of the present invention are described and illustrated herein with respect to a wind turbine, and more specifically, a wind generator. However, embodiments (whether described and/or illustrated herein) of the methods, caps, and blades of the present invention are not limited to wind generators, nor wind turbines generally. Rather, embodiments (whether described and/or illustrated herein) of the methods, caps, and blades of the present invention may be applicable to anything having one or more blades.

Exemplary embodiments of the present invention are described and/or illustrated herein in detail. The embodiments are not limited to the specific embodiments described herein, but rather, components and steps of each embodiment may be utilized independently and separately from other components and steps described herein. Each embodiment's components and steps can also be used in combination with other embodiment's (whether described and/or illustrated herein) components and/or steps.

When introducing elements of the embodiments of the present invention, the articles "a", "an", "the" and "said" are intended to mean that there are one or more of the elements. The terms "comprising", "including" and "having" are intended to be inclusive and mean that there may be additional elements other than the listed elements. Moreover, use of the term "portion" with respect to something is intended to some or all of the thing.

While the invention has been described in terms of various specific embodiments, those skilled in the art will recognize that embodiments (whether described and/or illustrated herein) of the present invention can be practiced with modification within the spirit and scope of the claims.

What is claimed is:

1. A trailing edge cap for a blade, said trailing edge cap comprising a body configured to mount on at least two blades, wherein each of the at least two blades has at least one of a differing size and a differing shape, said body at least partially covers an original trailing edge portion of the blade, said body having a body edge portion for forming a new trailing edge portion of the blade when said body is mounted on the blade, said body edge portion having a first thickness defined between a higher pressure side of said body edge portion and a lower pressure side of said body edge portion when said body is mounted on the blade, and the original trailing edge portion of the blade having a second thickness defined between a higher pressure side of the blade and a lower pressure side of the blade, said first thickness less than the second thickness.

2. A trailing edge cap in accordance with claim 1 wherein said body edge portion is configured to mount on the blade such that said body at least partially covers the original trailing edge of the blade, and said body edge portion includes a body edge for forming a new trailing edge of the blade when said body is mounted on the blade.

3. A trailing edge cap in accordance with claim 2 wherein said body edge comprises a curved surface.

4. A trailing edge cap in accordance with claim 2 wherein said body is fabricated from a unitary sheet of material and is creased to form said body edge.

5. A trailing edge cap in accordance with claim 1 wherein said body is fabricated from two separate sheets of material.

6. A trailing edge in accordance with claim 5 wherein said two separate sheets of material are bonded together generally adjacent a body edge of said body edge portion.

7. A trailing edge cap in accordance with claim 1 wherein said body comprises a polymer.

8. A trailing edge cap in accordance with claim 7 wherein said body comprises a polyimide.

9. A trialing edge cap in accordance with claim 1 wherein said body has a body thickness of between about 1 mil and about 100 mils.

10. A trailing edge cap in accordance with claim 1 wherein said body has a modulus of elasticity of between about 0.5 GPa and about 5 GPa.

11. A trailing edge cap for a blade, said trailing edge cap comprising a body configured to mount on the blade such that said body at least partially covers an original trailing edge portion of the blade, said body comprising:
    a body edge portion for forming a new trailing edge portion of the blade when said body is mounted on the blade, said body edge portion having a first thickness defined between a higher pressure side of said body edge portion and a lower pressure side of said body edge portion when said body is mounted on the blade, the original trailing edge portion of the blade having a second thickness defined between a higher pressure side of the blade and a lower pressure side of the blade, said first thickness less than the second thickness; and
    at least one of a body thickness of between about 1 mil and about 100 mils, a modulus of elasticity of between about 0.5 GPa and about 5 GPa, and a polymer.

12. A trailing edge cap in accordance with claim 11 wherein said body edge portion is configured to mount on the blade such that said body at least partially covers the original trailing edge portion of the blade, and said body edge portion includes a body edge for forming a new trailing edge of the blade when said body is mounted on the blade.

13. A trailing edge cap in accordance with claim 12 wherein said body edge comprises a curved surface.

14. A trailing edge cap in accordance with claim 11 wherein said body comprises an adhesive for mounting said body on the blade.

15. A blade comprising:
    a blade body having a leading edge portion and an original trailing edge portion; and
    a trailing edge cap mounted on said blade body and at least partially covering said original trailing edge portion, said trailing edge cap comprising:
        a trailing edge cap body comprising a body edge portion having a first thickness defined between a higher pressure side of said body edge portion and a lower pressure side of said body edge portion when said trailing edge cap body is mounted on said blade body, said body edge portion forming a new trailing edge portion of said blade body, said original trailing edge portion of said blade body having a second thickness defined between a higher pressure side of said blade body and a lower pressure side of said blade body, said first thickness less than said second thickness; and at least one of a trailing edge cap body thickness of between about 1 mil and about 100 mils, a modulus of elasticity of between about 0.5 GPa and about 5 GPa, and a polymer.

16. A blade in accordance with claim 15 wherein said original trailing edge portion comprises an original trailing edge, said new trailing edge portion comprises a new trailing edge, and said new trailing edge portion at least partially covers said original trailing edge.

17. A blade in accordance with claim 16 wherein said original trailing edge is formed by an intersection between said higher pressure side and said lower pressure side of said blade body, said new trailing edge is formed by an intersection between a first side of said trailing edge cap and a second side of said trailing edge cap, said first side is mounted on said higher pressure side, and said second side is mounted on said lower pressure side.

18. A blade in accordance with claim 15 wherein said trailing edge cap comprises a polyimide.

19. A blade in accordance with claim 15 wherein said trailing edge cap is mounted on said blade body adjacent a tip of said blade body.

20. A method comprising:

providing a trailing edge cap for a blade, wherein the trailing edge cap includes a body that includes a body edge portion having a first thickness defined between a higher pressure side of the body edge portion and a lower pressure side of the body edge portion when the body is mounted on the blade; and mounting the trailing edge cap on the blade such that the trailing edge cap at least partially covers a trailing edge portion of the blade having a second thickness, the first thickness less than the second thickness.

21. A method in accordance with claim 20 wherein said mounting the trailing edge cap on the blade comprises:

mounting a first side of the trailing edge cap on a higher pressure side of the blade; and mounting a second side of the trailing edge cap on a lower pressure side of the blade, such that the trailing edge cap at least partially covers a trailing edge portion of the blade formed by an intersection between the higher and lower pressure sides.

\* \* \* \* \*